United States Patent [19]
Ichimura et al.

[11] Patent Number: 5,942,551
[45] Date of Patent: Aug. 24, 1999

[54] NON-CROSSLINKED LINEAR LOW DENSITY POLYETHYLENE PREEXPANDED PARTICLES AND MANUFACTURING METHOD THEREFOR

[75] Inventors: Tadayuki Ichimura, Settsu; Minori Yamaguchi, Akashi, both of Japan

[73] Assignee: Kaneka Corporation, Osaka, Japan

[21] Appl. No.: 09/208,854

[22] Filed: Dec. 10, 1998

[30] Foreign Application Priority Data

Dec. 15, 1997 [JP] Japan .................................. H09-344578

[51] Int. Cl.$^6$ ........................................................ C08J 9/22
[52] U.S. Cl. ................................. 521/58; 521/59; 521/60
[58] Field of Search .................................. 521/58, 59, 60

[56] References Cited

U.S. PATENT DOCUMENTS 5,459,169  10/1995  Tokoro et al. ............................. 521/60

Primary Examiner—Morton Foelak
Attorney, Agent, or Firm—Armstrong, Westerman, Hattori, McLeland & Naughton

[57] ABSTRACT

Resin particles made from a resin mixture of 30 to 70 wt % of a linear low-density polyethylene I having a resin density of 0.930 to 0.935 g/cm$^3$ and an MI of 1 g/10 minutes or higher and 70 to 30 wt % of a linear low-density polyethylene II having a resin density of 0.915 to 0.925 g/cm$^3$ and an MI of 2 g/10 minutes or higher are impregnated under pressurization with a volatile expansion agent, and released into a low-pressure atmosphere to yield non-crosslinked linear low density polyethylene preexpanded particles, which, when subjected to expansion molding inside a mold, exhibit good moldability, and yield molded articles that have an attractive external appearance and exhibit outstanding cushioning properties.

3 Claims, No Drawings

NON-CROSSLINKED LINEAR LOW DENSITY POLYETHYLENE PREEXPANDED PARTICLES AND MANUFACTURING METHOD THEREFOR

BACKGROUND OF THE INVENTION

1. Field of the Invention

This invention pertains to non-crosslinked linear low density polyethylene preexpanded particles and a manufacturing method therefor, and more particularly to preexpanded particles used in the expansion and formation of non-crosslinked polyethylene expansion-molded articles in bead molds, which articles are used as cushioning packaging materials in the packaging of home electric goods, components in general, and electronic equipment components, and to non-crosslinked linear low density polyethylene preexpanded particles wherewith molded articles can be provided that exhibit good moldability during said expansion molding, the external appearance of which is attractive, and which exhibit outstanding cushioning properties.

2. Description of the Related Art

Expansion-molded articles made in bead molds of non-crosslinked linear low density polyethylene preexpanded particles, because of the properties of the base resin, exhibit suitable softness and mechanical strength, and are therefore widely used as cushioning materials for packaging home electric goods, components in general, and electronic equipment components. Disclosures concerning such non-crosslinked linear low density polyethylene preexpanded particles are made, for example, in Unexamined Patent Application No. S62-15239/1987 and Unexamined Patent Application No. S58-76433/1983 (both in gazette). The non-crosslinked linear low density polyethylene preexpanded particles disclosed in these patent applications employ as the base resin a copolymer of ethylene and an α-olefin having from 4 to 10 carbons, this copolymer having a melting point of 115 to 130° C., or, alternatively, above 115° C., and a resin density of 0.915 to 0.940 g/cm$^3$, or, alternatively, 0.915 to 0.950 g/cm$^3$, and an MI (melt index, and so hereinafter) of 0.1 to 5 (g/10 minutes, and so hereinafter). Preexpanded particles exhibiting outstanding moldability are said to be obtainable therewith, using, as means for enhancing in-mold moldability, a method for regulating the mean cell diameter of the preexpanded particles within a range of 120 to 1200 μ, and means for making the high-temperature peak energy of the two heat-absorption peaks appearing in the DSC curve obtained by measurement with a differential scanning calorimeter to be 5 J/g or higher.

However, in cases of preexpanded particles having as their base resin one exhibiting a resin density of 0.930 g/cm$^3$ or higher and a melting point of 125° C. or higher, even when that base resin is a linear low-density polyethylene, the molded articles exhibit deteriorating impact resistance and brittleness, and crystal fusion is sharp, wherefore, even if the heating temperature during resin particle expansion is constant, as the heating time becomes longer, the energy (J/g) at the high-temperature peak of the two heat-absorption peaks that appear in the DSC curve obtained by measurement with a differential scanning calorimeter increases, and a phenomenon is observed whereby the mean cell diameter of the preexpanded particles becomes increasingly minute over the course of expansion. For this reason, when such preexpanded particles are mixed and used in molding, the surface properties of the molded articles are poor, and the mean cell diameters of a cut surface inside the molded articles are uneven and the appearance is poor. These are problems which remain.

In view of the situation described in the foregoing, linear low-density polyethylene having a resin density of 0.930 g/cm$^3$ or higher and a melting point of 125° C. or higher is currently not used in practice as a base resin for preexpanded particles. Moreover, the linear low-density polyethylene suitable for expansion, having a density of 0.925 to 0.928 g/cm$^3$ and an MI of 2 to 5 g/10 minutes is all but unavailable from American and European resin manufacturers, and hence in many cases are imported from Japan for use, giving rise to the problem of enormous shipping cost.

SUMMARY OF THE INVENTION

Thereupon, an object of the present invention is to provide preexpanded particles exhibiting good moldability and attractive external appearance while yielding molded articles having outstanding cushioning properties, even when using as the base resin linear low-density polyethylene having a resin density of 0.930 g/cm$^3$ or higher and a melting point of 125° C. or higher, as noted above, conventionally considered to be unsuitable for expansion.

The inventors, in view of the situation described in the foregoing, conducted assiduous research toward the end of obtaining preexpanded particles exhibiting uniform cell diameters having a good outward appearance, with little change in mean cell diameter exhibited over the course of expansion, and also exhibiting good moldability and usable under a wide range of molding process conditions, even when using as the base resin linear low-density polyethylene having a resin density of 0.930 g/cm$^3$ or higher and a melting point of 125° C. or higher. As a result, the inventors discovered that non-crosslinked linear low density polyethylene preexpanded particles usable under a wide range of molding process conditions without lowering the strength thereof, can be obtained by using, as the base resin for the preexpanded particles, a resin obtained by the molten mixing together of 30 to 70 wt % of a linear low-density polyethylene I having a resin density of 0.930 to 0.935 g/cm$^3$ and an MI of 1 or higher, and 70 to 30 wt % of a linear low-density polyethylene II having a resin density of 0.915 to 0.925 g/cm$^3$ and an MI of 2 or higher, this yielding uniform cell diameters, with little change in the mean cell diameter during the course of expansion, and also that, from these preexpanded particles, molded articles can be obtained that exhibit attractive outward appearance and outstanding cushioning properties, thus leading to the perfection of the present invention.

In other words, the non-crosslinked linear low density polyethylene preexpanded particles of the present invention are formed by expanding particles of a linear low-density polyethylene having as its base resin one that is a mixture of 30 to 70 wt % of a linear low-density polyethylene I having a resin density of 0.930 to 0.935 g/cm$^3$ and an MI of 1 or higher and 70 to 30 wt % of a linear low-density polyethylene II having a resin density of 0.915 to 0.925 g/cm$^3$ and an MI of 2 or higher.

The manufacturing method for non-crosslinked linear low density polyethylene preexpanded particles in the present invention, moreover comprises the steps of: placing in a pressure vessel a water dispersion comprising water, a dispersing agent, a volatile expansion agent, and resin particles the base resin whereof is a mixture of 30 to 70 wt % of a linear low-density polyethylene I having a resin density of 0.930 to 0.935 g/cm$^3$ and an MI of 1 or higher and 70 to 30 wt % of a linear low-density polyethylene II having a resin density of 0.915 to 0.925 g/cm$^3$ and an MI of 2 or higher; impregnating the resin particles with the volatile expansion agent at a temperature within a range of 20° C. below to 10° C. above the melting point of the resin particles; and releasing the mixture of the resin particles and water in an atmosphere at a lower pressure than inside the pressure vessel, under pressurization at or above the vapor pressure exhibited by the volatile expansion agent.

The linear low-density polyethylene mentioned in the present invention is a copolymer of ethylene and an α-olefin, examples of the α-olefin being butene-1, hexene-1, octene-1, and 4-methyl-pentene-1.

The linear low-density polyethylene I in the base resin of the preexpanded particles of the present invention exhibits a resin density of 0.930 to 0.935 g/cm$^3$ and an MI of 1 or higher. It is preferable that the α-olefin in this case be either hexene-1, octene-1, or 4-methylpentene-1. The quantity of α-olefin contained in the linear low-density polyethylene I will differ depending on the type of α-olefin used, but it is preferable that it be 3 to 9% to put the resin density within the noted range. The melting point of the linear low-density polyethylene I will also vary depending on the type of α-olefin used, but it is preferably within a range of 125 to 128° C. Above 128° C., no improvement in moldability is realized even when the amount of linear low-density polyethylene of lower density mixed in is large, and the physical properties are compromised.

The linear low-density polyethylene II in the base resin exhibits a resin density of 0.915 to 0.925 g/cm$^3$ and an MI of 2 or greater but preferable between 2 and 5. In this case, octene-1, hexene-1, and butene-1 are preferable for the α-olefin. In order to keep the resin density of the linear low-density polyethylene II within the range noted above, it is desirable to make the content of α-olefin in the linear low-density polyethylene II to be 6 to 12%, ordinarily, although that will differ depending on the type of α-olefin used. The linear low-density polyethylene II is preferably one having a melting point between 120 and 123° C. If 123° C. is exceeded, compatibility with the linear low-density polyethylene I is compromised, whereas strength is adversely affected below a melting point of 120° C. It is preferable that the resin used as this linear low-density polyethylene II exhibit either a shoulder in the heat-absorption peak curve, or two or more peak curves, when measured with a differential scanning calorimeter.

The particles of linear low-density polyethylene used in the manufacture of expanded particles in the present invention are made by kneading and granulating the linear low-density polyethylene I and linear low-density polyethylene II noted above. As to the ratio in which the linear low-density polyethylene I and linear low-density polyethylene II are mixed, the linear low-density polyethylene II should be 30 to 70 wt % relative to 70 to 30 wt % for the linear low-density polyethylene I. When the linear low-density polyethylene I exceeds 70 wt %, the change in mean cell diameter over the course of expansion is large, resulting in uneven cell diameters. At less than 30 wt %, on the other hand, the expanded articles exhibit inadequate rigidity, and the expansion multiplying factor cannot be made high, which constitutes a problem. Also, the particle weight in the present invention generally ranges from 0.5 mg/particle to 6.0 mg/particle. Below 0.5 mg/particle, it is hard to obtain a high expansion multiplying factor, whereas when 6.0 mg/particle is exceeded, mold packability deteriorates. Thus a range of 1.0 to 5.0 mg/particle is preferable.

The dispersing agent used in the manufacture of preexpanded particles in the present invention is employed to prevent coagulation between the resin particles during heating. The substances used for this purpose include water-soluble polymers such as polyvinyl alcohol, methyl cellulose, and N-polyvinyl pyrolidone, and such water-insoluble inorganic compounds as calcium phosphate, magnesium pyrophosphate, zinc carbonate, titanium oxide, and aluminum oxide, made into fine powder. When the inorganic compounds noted above are used, it is preferable to use in conjunction therewith a small amount of a surfactant such as alkylbenzene sodium sulfonate or α-olefin sodium sulfonate to assist dispersion, while reducing the amount of the inorganic compound used, in order to improve the fusion between preexpanded particles during expansion molding in the mold. In such cases, for 100 parts by weight of the resin particles, 1 to 3 parts by weight of the water-insoluble inorganic compound, in fine powder, should be used, with 0.001 to 1 part by weight of an anionic surfactant.

The volatile expansion agent used in the present invention is a hydrocarbon or halogenated hydrocarbon having a boiling point between −50 and 120° C., examples of which are propane, butane, pentane, hexane, heptane, cyclohexane, monochloromethane, dichloromethane monochloroethane, trichloromonofluoromethane, dichlorodifluoroethane, dichlorodifluoromethane, dichloromonofluoroethane, trichlorotrifluoroethane, and dichlorotetrafluoroethane, which may be used singly or in mixtures of two or more. The quantity of such volatile expansion agent used should be between 5 and 40 parts by weight to 100 parts by weight of resin, in terms of the quantity impregnated in the resin particles, taking into consideration the type of expanding agent, the expansion multiplying factor desired, and the ratio between the quantity of resin inside the pressure vessel and the volume of space inside the vessel.

As to the quantity of non-crosslinked linear low density polyethylene particles dispersed in the water, a ratio of 100 parts by weight of resin to between 100 and 300 parts by weight of water is desirable in the interest of productivity and resin particle dispersion stability.

The method of manufacturing non-crosslinked linear low density polyethylene preexpanded particles in the present invention involves placing a water dispersion comprising of linear low-density polyethylene particles, water, dispersing agent, and volatile expansion agent into a pressure vessel, impregnating the resin particles with the volatile expansion agent in a temperature range of from 20° C. lower than to 10° C. higher than the melting point of the resin, and releasing the mixture of resin particles and water into an atmosphere at a pressure lower than in the vessel, under pressurization at or above the vapor pressure exhibited by the volatile expansion agent. Resin samples were heated to 200° C. at a heating speed of 10° C./minute, then crystallized by cooling to room temperature at a cooling speed of 10° C./minute, after which the heat absorption curve was measured at a heating speed of 10° C./minute, using a differential scanning calorimeter (DSC), and the peak temperature obtained was taken as the melting point of the resin particles. Density values were determined according to JIS K6760 (JIS K7112D method), and MI values according to JIS K6760 (JIS K7210, at 190° C., with 2.16 kg loading).

The heating temperature during expansion of the resin particles differs according to the type of non-crosslinked linear low density polyethylene, the type of volatile expansion agent, and the expansion multiplying factor desired, but should be a temperature that is between 25° C. lower and 10° C. higher, and preferably between 20° C. lower and 10° C. higher, than the melting point of the non-crosslinked linear low density polyethylene. If the melting point is 125° C., for example, the heating temperature is selected within a range of 105° C. to 135° C. When the heating temperature is below this range, the expansion multiplying factor drops sharply, and only preexpanded particles having a very small mean cell diameter are obtained. When the heating temperature is above this range, the independent cell ratio of the preexpanded particles declines and moldability deteriorates undesirably.

An expansion multiplying factor of 10 to 40 for the preexpanded particles obtained as in the foregoing is desirable (bulk density of preexpanded particles=0.10 to 0.015 g/cm$^3$). The expansion multiplying factor is controlled primarily by adjusting the quantity of volatile expansion agent used. A mean cell diameter within the range of 200 to 500 $\mu$ is desirable. At mean cell diameters below 150 $\mu$, there is great shrinkage in the molded product during molding, and the molding heating conditions are narrowed, making molding difficult. When the mean cell diameter exceeds 500 $\mu$, on the other hand, it becomes difficult to achieve large expansion. In order to control the mean cell diameter of the preexpanded particles within the 200–500 $\mu$ range, it is desirable to make the quantity of $C_8$–$C_{18}$ fatty acid metal salt (such as calcium stearate) from 0 to 0.1 wt % or so. Adjustment can also be made by adding talc or other inorganic powder within a range of 0 to 0.1 wt %.

The method of molding the non-crosslinked linear low density polyethylene preexpanded particles of the present invention is called bead-mold expansion molding. The preexpanded particles obtained as in the foregoing may be packed into a molding mold that can be closed but not sealed, either just as they are or after drying, held while being heated for 10 to 60 seconds or so in steam at a pressure (gauge pressure) of 1.0 to 1.2 Kg/cm$^2$ or so to fuse the particles together, cooled in water, etc., removed from the mold, and cured for 24 hours in a drying room at 75° C. to 80° C., yielding the molded product.

DESCRIPTION OF THE PREFERRED EMBODIMENTS

Embodiments of the present invention are now described. The present invention is in no way limited by these embodiments. Embodiments 1–6 and comparative examples 1–3 are considered.

Non-crosslinked linear low density polyethylene resins having the compositions noted in Table 1 were kneaded and pulverized in an extruder to yield resin particles (4.5 mg/particle). Then 100 parts by weight of these resin particles were placed in a pressure vessel having a capacity of 1 cubic meter, together with 180 parts by weight of water, 2.0 parts by weight of calcium triphosphate and 0.03 parts by weight of normal sodium paraffin sulfonate as the dispersing agents, and 20 parts by weight of isobutane as the volatile expansion agent. While this was being stirred, the expansion temperature and internal pressure were regulated as indicated in Table 1. Then, while maintaining the pressure in the vessel with isobutane, the mixture of resin particles and water was released from an orifice of 4 mm diameter provided in the lower part of the vessel into a system wherein it was sprayed with warm water at 60° C. from a plurality of small-hole nozzles. The expanded particles so obtained were washed and dried. The expansion time was 50 minutes. The mean cell diameters of the expanded particles over time were measured at this time. The preexpanded particles so obtained were then packed into a 450 mm×300 mm×50 mm mold, and the expanded particles were heated in steam to fuse them together and yield a molded article in the mold. The molded article was removed from the mold and dry-cured for 24 hours in a drier at 80° C., after which cell diameter uniformity inside the molded article was evaluated. The measurement and evaluation methods used are described below.

Expanded particle mean cell diameter: The preexpanded particles were sampled at 5, 25, and 50 minutes after commencement of expansion. Twenty granules from each sample were examined, and the mean cell diameter was calculated from the number of cells crossing the expanded particle sections.

Cell diameter uniformity in a molded article: The molded article was cut near its center to a thickness of 2 mm and cell diameter uniformity was visually evaluated according to the following criteria.

◯: Very clean with no particles having small cell diameter.

Δ: 10–30% particles having small cell diameter.

×: Unclean, with more than 30% particles having very small cell diameter.

The results of measurements of mean cell diameters of the expanded particles and the results of evaluations of cell uniformity inside the molded article are given in Table 1.

TABLE 1

| | LINEAR LOW-DENSITY POLYETHYLENE PARTICLE RESIN COMPOSITION | | | | | | | |
|---|---|---|---|---|---|---|---|---|
| | L-LDPE (I) | | | | L-LDPE (II) | | | |
| No. | DENSITY g/cm$^3$ | MI | MELTING POINT ° C. | MIXING RATIO wt % | DENSITY g/cm$^3$ | MI | MELTING POINT ° C. | MIXING RATIO wt % |
| EMBODIMENT 1 | 0.930 | 2 | 126 | 70 | 0.92 | 2 | 120 | 30 |
| EMBODIMENT 2 | 0.932 | 1 | 125 | 70 | 0.92 | 2 | 120 | 30 |
| EMBODIMENT 3 | 0.932 | 1 | 125 | 50 | 0.92 | 2 | 120 | 50 |
| EMBODIMENT 4 | 0.932 | 2 | 126 | 50 | 0.92 | 2 | 120 | 50 |
| EMBODIMENT 5 | 0.932 | 2 | 126 | 30 | 0.92 | 2 | 120 | 70 |
| EMBODIMENT 6 | 0.935 | 2 | 126.5 | 30 | 0.92 | 2 | 120 | 70 |
| COMPARATIVE EXAMPLE 1 | 0.932 | 2 | 126 | 100 | | | — | |
| COMPARATIVE EXAMPLE 2 | 0.930 | 1 | 125 | 100 | | | — | |
| COMPARATIVE EXAMPLE 3 | 0.935 | 2 | 125 | 100 | | | — | |

TABLE 1-continued

| | PREEXPANDED PARTICLES | | | | | | MOLDED ARTICLES |
| --- | --- | --- | --- | --- | --- | --- | --- |
| | EXPANSION CONDITIONS | | EXPANSION | CELL DIAMETER EXPANSION TIME | | | INTERNAL CELL |
| No. | TEMPERA-TURE ° C. | PRESSURE kg/cm$^2$ | MULTIPLYING FACTOR TIMES | 5 MINUTES | 25 MINUTES | 50 MINUTES | DIAMETER UNIFORMITY |
| EMBODIMENT 1 | 115.0 | 20.0 | 40 | 350 | 330 | 300 | ◯ |
| EMBODIMENT 2 | 114.5 | 20.0 | 40 | 350 | 320 | 300 | ◯ |
| EMBODIMENT 3 | 114.5 | 19.5 | 40 | 300 | 280 | 250 | ◯ |
| EMBODIMENT 4 | 115.0 | 20.0 | 40 | 330 | 288 | 260 | ◯ |
| EMBODIMENT 5 | 115.5 | 19.5 | 40 | 300 | 270 | 250 | ◯ |
| EMBODIMENT 6 | 114.0 | 21.0 | 40 | 300 | 280 | 270 | ◯ |
| COMPARATIVE EXAMPLE 1 | 114.5 | 22.0 | 40 | 330 | 220 | 150 | Δ |
| COMPARATIVE EXAMPLE 2 | 114.5 | 22.0 | 40 | 350 | 200 | 130 | Δ |
| COMPARATIVE EXAMPLE 3 | 114.0 | 23.0 | 40 | 350 | 160 | 100 | X |

When the present invention is implemented, as described in the foregoing, it is possible to obtain preexpanded particles of uniform mean cell diameter over the course of expansion, even with linear low-density polyethylene of higher density, by mixing therewith, in specified proportions, linear low-density polyethylene of lower density, and also to obtain attractive molded articles using these preexpanded particles.

What is claimed is:

1. Non-crosslinked linear low density polyethylene preexpanded particles made by expanding particles of a linear low-density polyethylene having as its base resin a mixture of 30 to 70 wt % of a linear low-density polyethylene I having a resin density of 0.930 to 0.935 g/cm$^3$ and a melt index of 1 g/10 minutes or higher and 70 to 30 wt % of a linear low-density polyethylene II having a resin density of 0.915 to 0.925 g/cm$^3$ and a melt index of 2 g/10 minutes or higher.

2. The non-crosslinked linear low density polyethylene preexpanded particles according to claim 1, wherein the melting point of the linear low-density polyethylene I is 125 to 128° C. and the melting point of the linear low-density polyethylene II is 120 to 123° C.

3. A manufacturing method for non-crosslinked linear low density polyethylene preexpanded particles comprising the steps of:

placing a water dispersion comprising resin particles the base resin of which is a mixture of 30 to 70 wt % of a linear low-density polyethylene I having a resin density of 0.930 to 0.935 g/cm$^3$ and a melt index of 1 g/10 minutes or higher and 70 to 30 wt % of a linear low-density polyethylene II having a resin density of 0.915 to 0.925 g/cm$^3$ and a melt index of 2 g/10 minutes or higher, water, a dispersing agent, and a volatile expansion agent in a pressure vessel;

impregnating said resin particles with said volatile expansion agent at a temperature within a range of from 20° C. below to 10° C. above melting point of said resin particles;

and releasing mixture of said resin particles and water into an atmosphere at a pressure lower than that inside said pressure vessel, under pressurization at or above vapor pressure exhibited by said volatile expansion agent.

* * * * *